(12) United States Patent
Duffy et al.

(10) Patent No.: US 9,811,572 B2
(45) Date of Patent: Nov. 7, 2017

(54) MULTI-AXIS EXPAND/COLLAPSE FOR RELATIONAL DATABASES

(71) Applicant: InsightSoftware.com International, Bray, County Wicklow (IE)

(72) Inventors: Paul Duffy, Lake Forest, CA (US); Amir Kashani, Irvine, CA (US)

(73) Assignee: INSIGHTSOFTWARE.COM INTERNATIONAL, Bray (IE)

( * ) Notice: Subject to any disclaimer, the term of this patent is extended or adjusted under 35 U.S.C. 154(b) by 0 days.

(21) Appl. No.: 15/465,346

(22) Filed: Mar. 21, 2017

(65) Prior Publication Data
US 2017/0293664 A1 Oct. 12, 2017

Related U.S. Application Data

(60) Provisional application No. 62/319,230, filed on Apr. 6, 2016, provisional application No. 62/451,581, filed on Jan. 27, 2017.

(51) Int. Cl.
*G06F 17/30* (2006.01)
(52) U.S. Cl.
CPC .. *G06F 17/30554* (2013.01); *G06F 17/30315* (2013.01); *G06F 17/30483* (2013.01)
(58) Field of Classification Search
CPC ......... G06F 17/30554; G06F 17/30864; G06F 17/30867; G06F 17/30991; G06F 17/30696; G06Q 30/02
See application file for complete search history.

(56) References Cited

U.S. PATENT DOCUMENTS

| | | | |
|---|---|---|---|
| 8,327,256 B2 | 12/2012 | Choudhury | |
| 8,473,837 B2 | 6/2013 | Thanu et al. | |
| 2009/0254971 A1* | 10/2009 | Herz | G06Q 10/10 726/1 |
| 2010/0017395 A1* | 1/2010 | Wayn | G06F 17/30386 707/E17.014 |
| 2013/0117305 A1* | 5/2013 | Varakin | G06F 9/5072 707/769 |

\* cited by examiner

*Primary Examiner* — Cam-y Truong
(74) *Attorney, Agent, or Firm* — Neugeboren O'Dowd PC

(57) ABSTRACT

This disclosure describes systems, methods, and apparatus for expanding a row or column in an existing report, sourced from a relational database, where a column or row, respectively, of an opposite axis has already been expanded. Such a need often arises in reports sourced from a SQL database, and overcomes the storage-draining need to precompute all possible arrangements of data from the database prior to displaying the report. In some embodiments, a client can make a request for a multi-axis expansion, and a server can create filters for use in sub queries, one for each level of expansion in an axis of the report opposite to the axis where expansion is requested, the sub queries can be executed, results sets can be combined/formatted to form a new report, and the new report can be returned to the client for stitching into the existing report.

9 Claims, 15 Drawing Sheets

| Country | State | Amount |
|---|---|---|
| -USA | | |
| | CA | 200 |
| | NV | 100 |
| | Total USA | 300 |
| +Canada | | 50 |
| +Mexico | | 70 |

| Country | -2014 | | | +2015 | +2016 |
|---|---|---|---|---|---|
| | Q1 Amount | Q2 Amount | Total | | 200 |
| USA | 100 | 200 | 300 | 300 | 300 |
| Canada | 20 | 30 | 50 | 50 | 50 |
| Mexico | 30 | 40 | 70 | 70 | 70 |

MULTI-AXIS EXPAND/COLLAPSE FOR RELATIONAL DATABASES

CLAIM OF PRIORITY UNDER 35 U.S.C. §119

The present Application for Patent claims priority to Provisional Application No. 62/319,230 entitled "MULTI-AXIS EXPAND/COLLAPSE FOR RELATIONAL DATABASES" filed Apr. 6, 2016, and Provisional Application No. 62/451,581 entitled "MULTI-AXIS EXPAND/COLLAPSE FOR RELATIONAL DATABASES" filed Jan. 27, 2017, both assigned to the assignee hereof and hereby expressly incorporated by reference herein.

FIELD OF THE DISCLOSURE

The present disclosure relates generally to relational database queries. In particular, but not by way of limitation, the present disclosure relates to systems, methods and apparatuses for multi-axis expansion of result tables generated by one or more queries to a relational database server.

DESCRIPTION OF RELATED ART

Database results often appear with column and row headings that can be expanded and collapsed to show more detail. For instance, given a sales tracking report showing sales for the USA, Canada, and Mexico, one may have the option of drilling down into each country to see the number of sales made on a state-by-state basis within a given country. To provide these further levels of detail, sub queries of the original tables used to generate the report are made. Where only rows or only columns are being expanded, such sub queries are routine. However, where one or more rows are already expanded and a user requests expansion of one or more columns, or where one or more columns are already expanded and a user requests expansion of one or more rows, this multi-axis expansion proves very difficult to execute in SQL, and especially where the underlying tables comprise relational data. Multi-axis expansion is sometimes also referred to as "drill down."

Some prior art systems rely on online analytical processing (OLAP) cubes for the underlying data, and in such cases, performing multi-axis expansions is known in the art. However, OLAP cube-based databases typically use large amounts of storage since they precompute all possible combinations of sub tables, and are thus not suitable for all database applications. They can also be costly from a batch processing time standpoint. For instance, as one adds more and more dimensions to a cube, it gets exponentially larger and larger in storage as the cube pre-computes all or most aggregations and other calculations that a user may query for. Imagine an OLAP cube contained the population figure for every city in every state in every country: the database could quickly sum up the cities in each state, and the states in each city, and store those results in storage. The process of aggregation would take a short time and the results occupy a small amount of storage. However, such small sets of data are rarely found in practice. Real systems call for far greater numbers of nodes. For instance, add the dimension Gender: processing time and storage space just doubled. Now add the dimension Age in Years (0 to 110 say): processing time and storage space just multiplied by 111. Thus, OLAP cube storage and processing requirements quickly balloon in practice.

Additionally, because of the storage-intensive nature of OLAP cubes, OLAP cubed-based databases often do not store every possible combination of data, often leaving out pre-computed results for the lowest-level sub-query combinations (e.g., individual transactions). Thus, while their speed is an advantage, in many cases they do not allow all sub-queries to be addressed. Where OLAP cubes are not preferred, but rather underlying data in the form of relational databases is used, solutions to the problem of multi-axis expansions has not been forthcoming.

Additionally, adding dimensions or changing structures such as hierarchies in an OLAP cube often entails a level of technical skill usually beyond the typical user. Instead, expensive consultants often have to be brought in to make such changes. It is also difficult for OLAP cubes to handle data which changes frequently, as they need that long processing time to update their pre-aggregations.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a relational database device for performing multi-axis expansion of a row or column of an existing report, where newly-visible data is sourced from a relational database. The device can include a processing portion with one or more processing components therein. The device can also include a memory coupled to the processing portion. The device can yet further include a multi-axis expander module stored on the memory and executable on the processing portion to perform a number of steps. Those steps can include forming an existing report based on a SQL database, the existing report comprising rows and columns of data, row headings for the rows, and column headings for the columns. They can include receiving at a server device a request from a client device, wherein the request is for expansion of a row or column, where a column or row, respectively, has already been expanded. They can also include creating one or more sub queries, where a number of the one or more sub queries corresponds to a number of levels of already-expanded nodes in an axis opposite to the axis where the expansion is requested. Each of the one or more sub queries can include: a SELECT filter, the SELECT filter being the same for each of the one or more sub queries, the SELECT filter including children of the node being expanded and nodes from one or more levels of the opposite axis related to any expanded nodes of the opposite axis, and a WHERE filter, different for each of the one or more sub queries, the WHERE filter including the node being expanded and any parent nodes of the node being expanded as well as nodes from one or more levels of the opposite axis related to any expanded nodes of the opposite axis. The steps can further include executing the one or more sub queries to form a results set for each of the one or more sub queries. The steps can yet further include combining the results sets into a new report, the new report including data and headings to populate new blank columns and rows in the existing report, the new report configured for stitching into the blank columns and rows in the existing report.

Other embodiments of the disclosure may also be characterized as a method of multi-axis expansion of a row or column or an existing report, where newly-visible data is sourced from a relational database. The method can include forming an existing report based on a SQL database, the existing report comprising rows and columns of data, row headings for the rows, and column headings for the columns. The method can also include receiving at a server device a request from a client device, wherein the request is for expansion of a row or column, where an opposite-axis column or row, respectively, has already been expanded. The method can yet further include creating one or more sub queries, where a number of the one or more sub queries corresponds to a number of levels of already-expanded nodes in an axis opposite to the axis where the expansion is requested. Each of the one or more sub queries can include: a SELECT filter, the SELECT filter being the same for each of the one or more sub queries, the SELECT filter including children of the node being expanded and nodes from one or more levels of the opposite axis related to any expanded nodes of the opposite axis, and a WHERE filter, different for each of the one or more sub queries, the WHERE filter including the node being expanded and any parent nodes of the node being expanded as well as nodes from one or more levels of the opposite axis related to any expanded nodes of the opposite axis. The method can also include executing the one or more sub queries and returning a results set for each of the one or more sub queries. The method also may include combining the results sets into a new report, the new report including data and headings to populate new blank columns and rows in the existing report, the new report configured for stitching into the blank columns and rows in the existing report.

Other embodiments of the disclosure can be characterized as a method for multi-axis expansion of a row or column of an existing report, where newly-visible data is sourced from a relational database. The method can include forming an existing report based on a SQL database, the existing report comprising rows and columns of data, row headings for the rows, and column headings for the columns. The method can also include receiving at a server device a request from a client device, wherein the request is for expansion of: one of the rows of the existing report where one of the columns of the existing report is already expanded by at least one node; or one of the columns of the existing report where one of the rows of the existing report is already expanded by at least one node. The method can further include creating one or more sub queries, where a number of the one or more sub queries corresponds to a number of levels of already-expanded nodes in an axis opposite to the axis where the expansion is requested. The method can yet further include executing the one or more sub queries and returning a results set for each of the one or more sub queries. The method further may include combining the results sets into a new report, the new report including data and headings to populate new blank columns and rows in the existing report. The new report can be configured for stitching into the blank columns and rows in the existing report.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 1 illustrates an example report where a row is expanded;

FIG. 2 illustrates the report of FIG. 1, where a column instead of a row is expanded;

DETAILED DESCRIPTION

Figure 3:
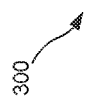
FIG. 3 illustrates the report of FIG. 1, where both rows and columns are expanded.

The word "exemplary" is used herein to mean "serving as an example, instance, or illustration." Any embodiment described herein as "exemplary" is not necessarily to be construed as preferred or advantageous over other embodiments.

For the purposes of this disclosure, a "relational database server" (or relational database management system (RDBMS)) is a server that oversees a relational database, or a collection of data items organized as a set of formally-described tables from which data can be accessed or reassembled in many different ways without having to reorganize the database tables. Each table (which is sometimes called a relation) contains one or more data categories in columns. Each row contains a unique instance of data for the categories defined by the columns. For example, a typical business order entry database would include a table that described a customer with columns for name, address, phone number, and so forth. Another table would describe an order: product, customer, date, sales price, and so forth. A user of the database could obtain a view of the database that fitted the user's needs. For example, a branch office manager might like a view or report on all customers that had bought products after a certain date. A financial services manager in the same company could, from the same tables, obtain a report on accounts that needed to be paid. Exemplary relational database products include, but are not limited to, IBM DB2, MICROSOFT SQL Server, and ORACLE SERVER. Most relational database servers use the structured query language (SQL) as their query language, although other query languages are also applicable (e.g., the pre-1996 implementation of Ingres QUEL).

For the purposes of this disclose, an "OLAP server" is a specialized database engine capable of handling multidimensional data cubes. An OLAP server stores its data in multidimensional array structures (array data types that are referenced by multiple indexes) or "cubes" rather than in tables, as does a relational database. Cubes are constructed in such a way that each combination of dimensional data attributes with the relevant numeric additive data is either precalculated or easy to compute very quickly.

For the purposes of this disclosure, an "item" is a node that a user selects with the desire of seeing the node expanded. For instance, a user may click on an item "CA" (the state), expecting the report to expand the item "CA" to show all cities within CA that have data values as well as those data values.

For the purposes of this disclosure, a "node" is a single element within a SQL database. For instance, "CA,", "USA", and "2015" could be nodes within a SQL database. An item is a subset of all nodes, whereas nodes are not subsets of an item. In other words, a user typically selects one or more items from all visible nodes within a report for expansion.

For the purposes of this disclosure, a "level" is all nodes in a given row or column. For instance, a level may include the nodes "2014", "2015", and "2016", but would not include quarters. As another example, a level may include all cities within a given state having data values.

For the purposes of this disclosure, a "depth" refers to a level of expansion. Depth is described with integers, such as 1, 2, and 3, or 0, 1, and 2. Depth can be used to describe an actual level of expansion for a node or can be used to describe a maximum level of expansion that is possible for a node. For instance, a year node can be expanded to show a level including quarter nodes, and each quarter could be expanded to show a level including month nodes. If the year level was the topmost level, or depth 0, then the quarter level would be at a depth of 1, and the month level would be at a depth of 2.

The present disclosure relates generally to relational database queries rather than queries to an OLAP server. In particular, but not by way of limitation, the present disclosure relates to systems, methods and apparatuses for multi-axis expansion of result tables generated by one or more queries to a relational database server.

FIG. 1 illustrates an example report where a row is expanded. In this example, the Country column includes USA, Canada, and Mexico, and the "+" sign next to the "Cananda" and "Mexico" labels indicates that these rows or items are expandable, while the "−" sign next to the "USA" label indicates that this row has already been expanded. For instance, USA has been expanded to show two subcategories, which in this case are states, California and Nevada. Such an expansion causes the addition of the rows highlighted in cross hatching and further requires a sub query for the amounts for both states. For instance, <select state, sum(amount) where country='USA'> could be one SQL query used to obtain these values.

FIG. 2 illustrates the report of FIG. 1, where a column instead of a row is expanded. In this version of the report, USA, Canada, and Mexico are not expandable, but the column labels for the year are expandable (e.g., to show data for quarterly amounts in each year). Here, 2014 has been expanded to show first and second quarter amounts (e.g., no data is available for the third and fourth quarters). The crosshatched area shows the new report that has been added to the original report when the expansion was requested. Again, a sub query is performed to return the results for the quarters in 2014. One such SQL query could be written as <select qtr, sum(amount) where year=2014>.

FIG. 3 illustrates the report of FIG. 1, where both rows and columns are expanded. In this version of the report, assume that the USA was already expanded to show rows for the states CA and NV, and that the corresponding sub query was performed, and the results presented for each of the non-expanded years 2014, 2015, 2016. Now, a user request is made to expand the year 2014 to show quarterly amounts for that year. In this case, the crosshatched cells again show the new report, or the data and headings that have to be added to the report. However, unlike in FIGS. 1 and 2, where only a single query had to be made and only a single new report or sub report had to be stitched into the existing report, here multiple sub queries are performed and those multiple sets of results are stitched together into the original query. In this example, two sub queries are performed and two resulting reports are stitched into the original report (a first new report highlighted in light cross hatching, a second new report highlighted in dark cross hatching, and two column headings in a third cross hatching). While the human mind in hindsight may easily contemplate how to perform two such queries and stitch them into the existing report, performing this task using SQL queries and at scale (e.g., where thousands of cells and many layers of expansion are involved) is anything but trivial.

One of skill in the art will recognize that either the rows or columns in FIG. 3 could have been expanded first, and in either case a similar challenge is presented. Further, this disclosure will describe a solution to the multi-axis expansion challenge that is agnostic to the axes—meaning that one of skill in the art can apply the herein-disclosed solutions regardless as to whether columns or rows are first expanded.

Figure 4A:
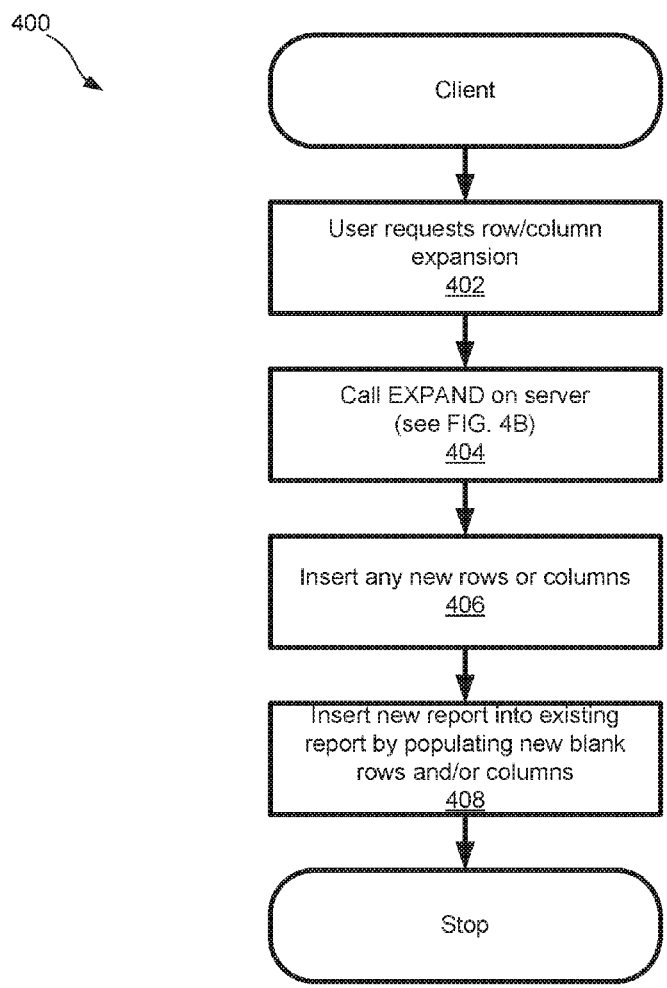
FIG. 4A illustrates one embodiment of a method for multi-axis expansion, and is detailed in sub-methods illustrated in FIGS. 4B-4H.

FIG. 4A illustrates one embodiment of a method for multi-axis expansion, and is detailed in sub-methods illustrated in FIGS. 4B-4H. The method 400 can begin on the client (e.g., a client device) with receipt or identification of a user request for a row or column expansion within an existing report, where one or more columns or rows, respectively, are already expanded. In other words, the method 400 involves expansion of a row or column where a column or row of the opposite axis has already been expanded. The method 400 can then call an EXPAND or similar operation on a server (e.g., a server device or server component of a computing device), the details of which are described relative to FIG. 4B. Optionally, some or all of the EXPAND operation can operate on both the server and client devices. Once the EXPAND or similar operation has performed on the server and a new report is returned from the server to the client, the client can add any new columns or rows that are needed to handle display of the new report and stitch the new report into the existing report by populating the new columns and/or rows. For instance, below is an existing report including an expansion of the year, 2014, into quarters, and an expansion of the country, USA, into states.

TABLE 1

Original Report

| Country | State | +Q1 | +Q2 | +Q3 | Total 2014 | +2015 | +2016 |
|---|---|---|---|---|---|---|---|
| −USA | +CA | 50 | 50 | 50 | 150 | 500 | 600 |
|  | +NV | 50 | 50 | 50 | 150 | 500 | 600 |
| Total USA |  | 100 | 100 | 100 | 300 | 500 | 600 |

If the row for the state CA is expanded, then a new report is generated and stitched into the existing report above to form the stitched report seen below.

TABLE 2

Stitched Report

| Country | State | City | +Q1 | +Q2 | +Q3 | Total 2014 | +2015 | +2016 |
|---|---|---|---|---|---|---|---|---|
| −USA | −CA |  | 50 | 50 | 50 | 150 | 500 | 600 |
|  |  | Irvine | 25 | 25 | 25 | 75 | 250 | 300 |
|  |  | Tustin | 25 | 25 | 25 | 75 | 250 | 300 |
|  | +NV |  | 50 | 50 | 50 | 150 | 500 | 600 |
| Total USA |  |  | 100 | 100 | 100 | 300 | 500 | 600 |

To help understand the method 400 as well as those details that will be described relative to FIGS. 4A-4H, an example multi-axis expansion taken from the above original report and stitched report will be used.

Figure 4B:
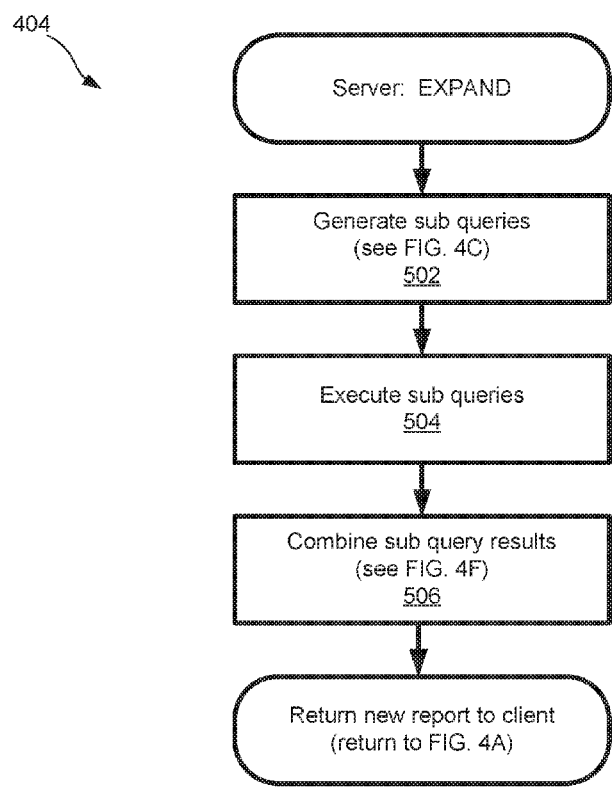
FIG. 4B illustrates an embodiment of the EXPAND function of FIG. 4A.

Turning to FIG. 4B (Block 404 from FIG. 4A), the server can perform the EXPAND or a similar operation (Block 502). First, the server can generate one or more sub queries as described in further detail relative to FIG. 4C. One sub query can be generated for each level of expansion in the opposite axis (the axis opposite to the axis where the expansion is requested). Any relational database server can then execute the sub queries (Block 504), and such a relational database server need not be part of this inventive apparatus or system. The server can then combine the sub query results returned from the relational database server into a new report (Block 506) (see FIG. 4F). The new report can then be returned to the client, and the results can be stitched into the existing report at the client as described relative to FIG. 4A. In an alternative embodiment, the server can perform the stitching and return a stitched report to the client. In some cases, the server that generates the sub queries and combines the sub query results can also be the relational database server that executes the sub queries.

Figure 4C:
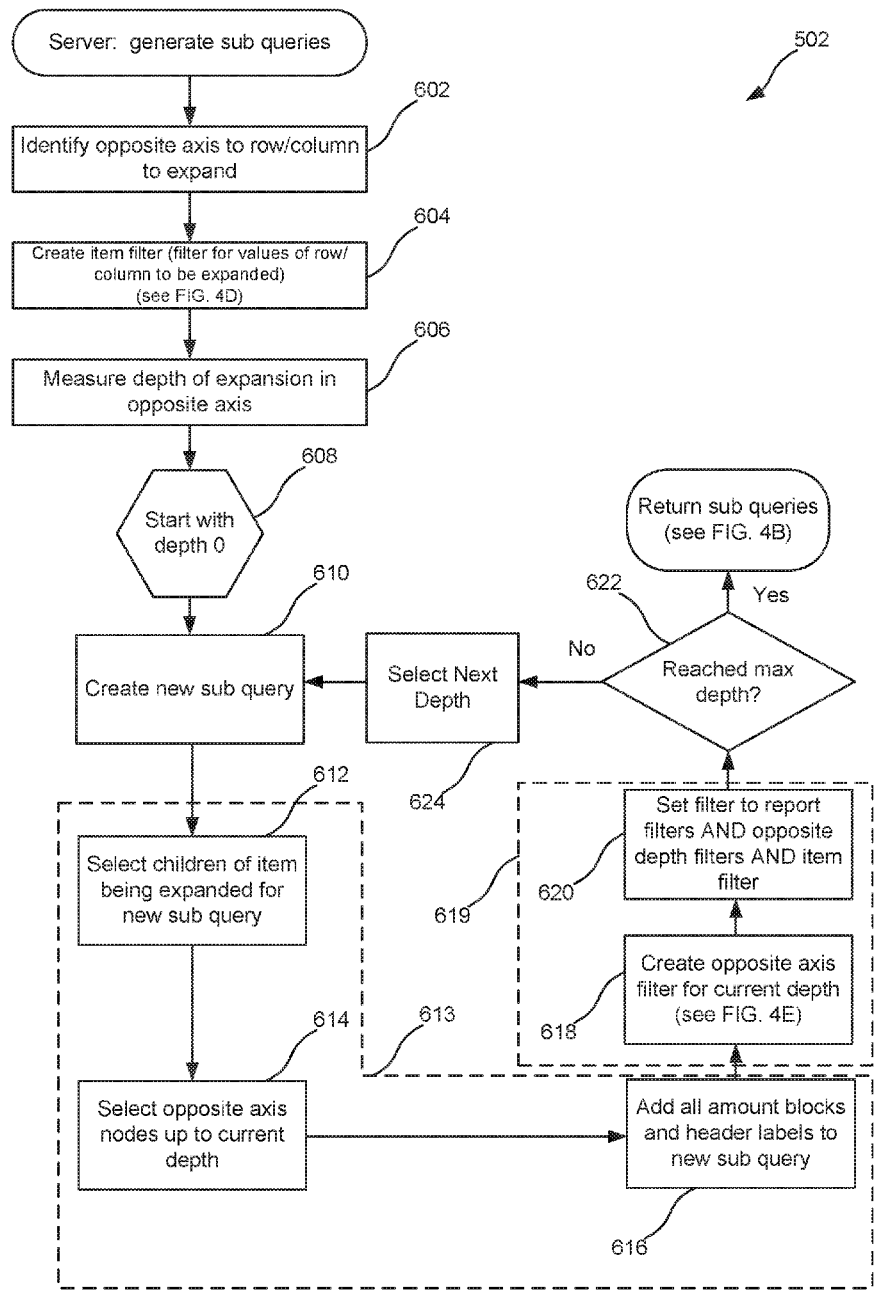
FIG. 4C illustrates an embodiment of operations for creating sub queries as part of the EXPAND function of FIG. 4B.

FIG. 4C illustrates the sub-method for generating the sub queries (Block 502). Initially, the server can identify an axis that is opposite to the row(s) or column(s) being expanded (Block 602). For instance, where a state of the node being expanded is "DOWN", then the opposite axis is "ACROSS," or whatever values may be used to describe states of the two axes. The server can then create a filter for values of the row(s) or column(s) being expanded (e.g., for the clicked item), which is described in greater detail relative to FIG. 4D (Block 604).

Figure 4D:
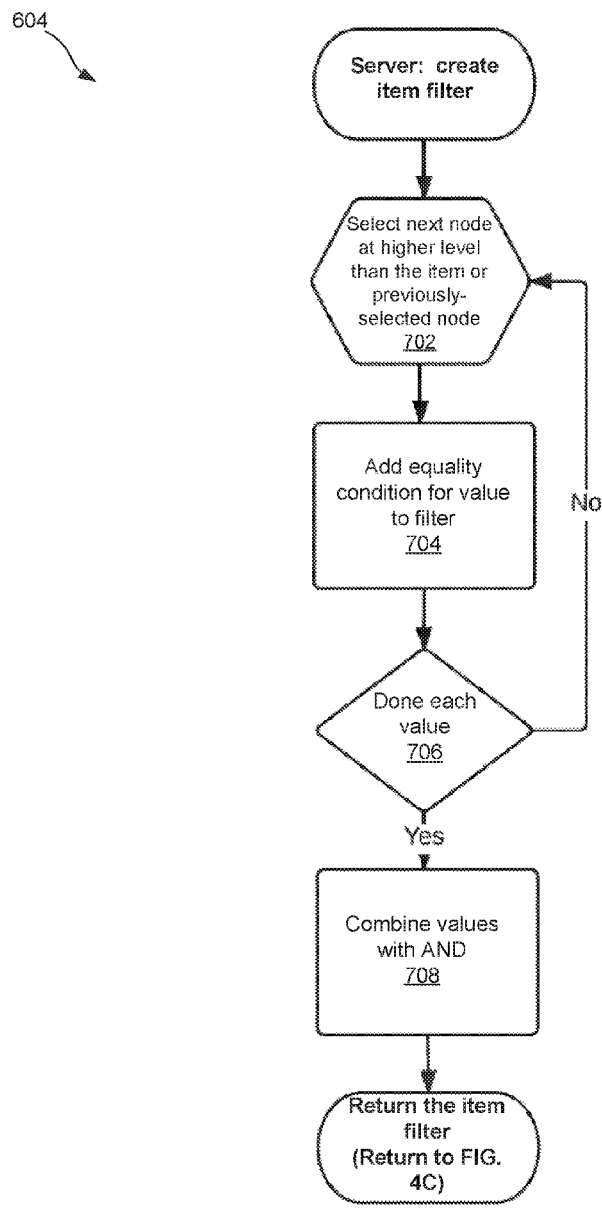
FIG. 4D illustrates an embodiment of a method for creating an item filter as part of the EXPAND function of FIG. 4A.

Turning to FIG. 4D, the process of creating the item filter for the clicked item, or item to be expanded, is discussed. In the example, this item filter will account for the COUNTRY and STATE items. To do this, the server selects the item being expanded (CA in the example) and any nodes related to the item, but at a higher level (Block 702) (e.g., USA in the example). The order of node selection is not important (e.g., CA or USA could have been selected first in the example). For each selected node (Block 702) the node value can be added to the item filter, for instance using an equality condition (Block 704) (e.g., WHERE state=CA). This loop continues until the item and all nodes related to, but at a higher level than, the item are incorporated into the item filter (Decision 706). Then, these equality conditions can be combined via an AND function (Block 708) (e.g., WHERE state=CA AND country=USA)), or a similar function, to form the item filter and the item filter can be returned to the portion of the method shown in FIG. 4C. This "item filter" can be used for each sub query and is the same for each sub query. For instance, the following two sub queries (in pseudo code) based on the example highlight use of the item filter in both sub queries:

| SELECT | |
|---|---|
| City | This comes from the item |
| Year | Opposite, depth 0 |
| Sum(Amount) | All amount columns are always included |
| FROM . . . | The tables |
| WHERE | |
| (report filters) | None in this example, but if the user manually placed any filters on the report, they would be included here (e.g. amount >500) |
| AND country='USA' | item filter |
| AND state='CA' | |
| AND ( | These are the filters from the opposite axis at this depth. We want to select all visible years |
| Year = 2014 | |
| OR Year = 2015 | |
| OR Year = 2016 | |
| ) | |

| SELECT | |
|---|---|
| City | This comes from the item |
| Year | Opposite, depth 0 |
| Quarter | Opposite, depth 1 |
| Sum(Amount) | All amount columns are always included |
| FROM . . . | The tables |
| WHERE | |
| (report filters) | None in this example, but if the user manually placed any filters on the report, they would be included here (e.g. amount >500) |
| AND country='USA' | item filter |
| AND state='CA' | |
| AND ( | At this depth, we are interested in visible quarters. Only 2014's quarters are expanded. If 2016 were also expanded, we would include filters for it and its years (Year = 2016 AND (Quarter = 1 OR 2 OR 3)) |
| Year = 2014 | |
| AND ( | |
| Quarter = 1 | |
| OR Quarter = 2 | |
| OR Quarter = 3 | |
| ) | |
| ) | |

Given the item filter, the method 400 can return to FIG. 4C at Block 604, where the server can measure a depth of expansion in an axis opposite to the axis being expanded. This measuring can analyze the text and cells of the existing report to determine the depth or can look at a tree hierarchy that is stored in memory, but not visible to the user. For instance, the tree may record that one column for the year 2014, given three columns for the years 2014, 2015, and 2016, has been expanded to show quarters within 2014. Analyzing this tree would reveal that the depth of expansion is 2 levels, or the value 1 where the base value is 0. In another embodiment, the client can keep track of the tree, and when the EXPAND operation is requested from the server, the client can provide an indication as to which nodes have been expanded and which node(s) needs further expanding. In other words, the server does not have a view of the entire report (i.e., those portions of the report that are not being expanded). Hence, the client tells the server what data is requested (e.g., what nodes have been expanded), but nothing more. For instance, in the example, the client does not provide the server any information regarding the NV row, nor does it provide any information regarding the 2015 and 2016 totals for the states, CA and NV. The client only provides the server an indication of the node or nodes that have been expanded, including a lowest node in the tree that has been expanded. Given this information, the server can turn to the opposite axis to that in which the expansion is being requested, and determine the number of nodes that have been expanded in the opposite axis based on the tree or expanded node indication provided by the client (Block 606).

Along these same lines, the server does not maintain knowledge of any client's state from one request to another. One advantage of this is that the server can support many clients without running out of capacity—in other words the system has greater scalability. The client, in its request to the server, can supply sufficient state information for the server to complete the request. For instance, the client can provide a layout of the report, selections that have been made in the report, and which nodes have been expanded and which have not. However, the server need not remember this state information for each client. The result is that a client can send the EXPAND request to any of a number of servers, or the EXPAND request can be distributed amongst multiple servers. Since the servers do not need to have any state information regarding the client, any one of a plurality of servers can handle the EXPAND request.

Given the depth, the following loop 608-624 can build a sub query for each level of the opposite axis. In the example this loop can build one sub query for YEAR and one sub query for QUARTER. The YEAR is the parent node and the QUARTER is the child node. The sub query for the parent, or YEAR, provides the annual results for the new items, Irvine and Tustin. The sub query for the child, or QUARTER, provides the quarterly results for the new items, Irvine and Tustin.

The loop 608-624 starts with the depth 0, or the first or highest node in the tree, and creates a new sub query (Block 610). The values to be selected or retrieved with the sub query include the children of the item being expanded (Block 612) (e.g., CITIES in the example), and nodes from the opposite axis up to the selected or current depth (Block 614) (e.g., YEAR for depth 0 and YEAR and QUARTERS for depth 1). The server can also add label blocks (Block 616) and value blocks to the sub query (Block 616) (e.g., see "SUM(AMOUNT)" in the pseudo code below). For instance, in the first sub query at depth 0, one sees that the label block YEAR is added, since the depth of this sub query is 0, and both YEAR and QUARTER are added as labels in "Sub query 2" since the depth for this second loop is 1. The below pseudo code for the two sub queries based on the example show the selections from Blocks 612, 614, and 616. The result of Blocks 612-612 can be referred to as a SELECT filter (Block 613).

```
SELECT
    City                  This comes from the item
    Year                  Opposite, depth 0
    Sum(Amount)           All amount columns are always included
FROM . . .                The tables
WHERE
    (report filters)      None in this example, but if the user
                          manually placed any filters on the report,
                          they would be included here (e.g.
                          amount >500)
    AND country='USA'     item filter
    AND state='CA'
    AND (                 These are the filters from the opposite axis
        Year = 2014       at this depth. We want to select all visible
        OR Year = 2015    years
        OR Year = 2016
    )
```

```
SELECT
    City                  This comes from the item
    Year                  Opposite, depth 0
    Quarter               Opposite, depth 1
    Sum(Amount)           All amount columns are always included
FROM . . .                The tables
WHERE
    (report filters)      None in this example, but if the user
                          manually placed any filters on the report,
                          they would be included here (e.g.
                          amount >500)
    AND country='USA'     item filter
    AND state='CA'
    AND (                 At this depth, we are interested in visible
        Year = 2014       quarters. Only 2014's quarters are
        AND (             expanded. If 2016 were also expanded, we
            Quarter = 1   would include filters for it and its years
            OR Quarter = 2  (Year = 2016 AND (Quarter = 1 OR 2 OR
            OR Quarter = 3  3))
        )
    )
```

Figure 4E:
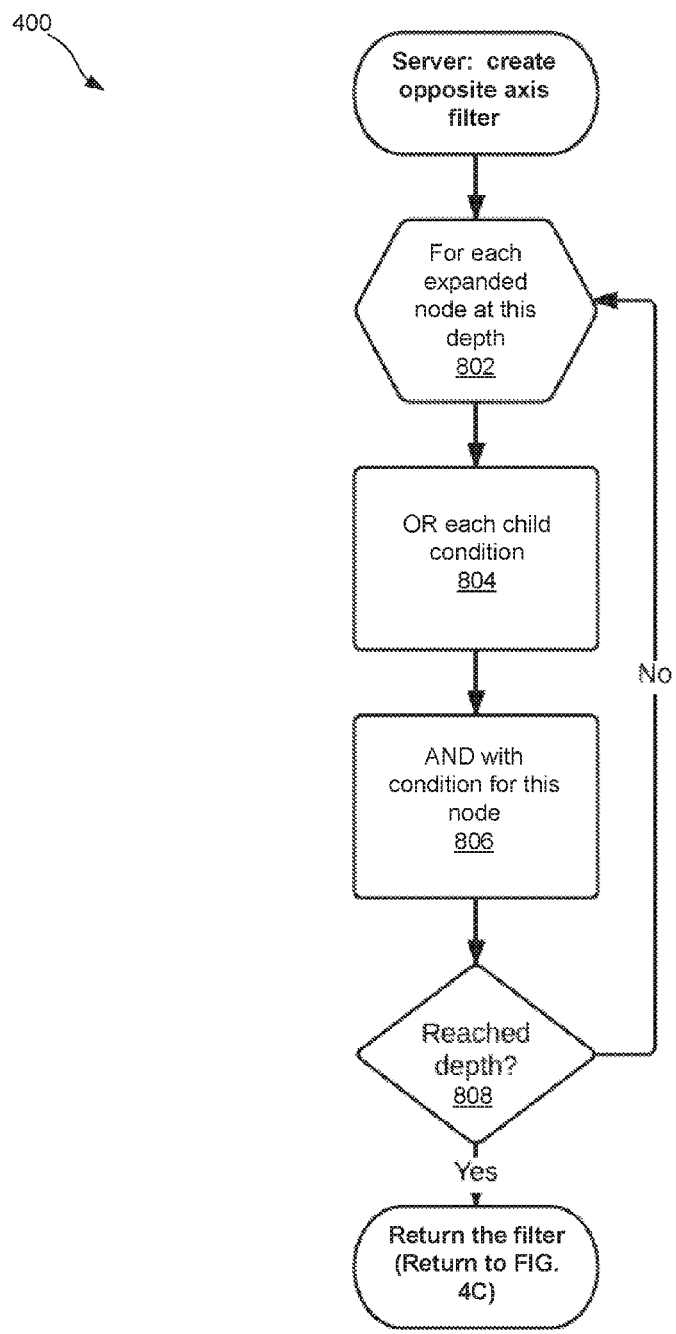
FIG. 4E illustrates an embodiment of a method for creating an opposite axis filter as part of the EXPAND function of FIG. 4A.

The server can then create an "opposite axis filter" for the current depth (Block 618), which is described in more detail in FIG. 4E. Report filters can optionally be added (e.g., via an AND function), the opposite axis filter, and the item filter can all be combined via AND functions (Block 620). If a maximum depth of expansion in the opposite axis has not been reached (e.g., in the example the first loop of 610-624 is at depth 0, and thus Decision 622=No), then the server selects a next depth (Block 624) and a subsequent sub query is created.

Turning to FIG. 4E, and recalling that a certain depth has been selected (e.g., depth 0, or YEAR in the example), the following takes place for each expanded node at the selected depth. For instance, in the example, only 2014 has been expanded, so only the child nodes of 2014 are addressed in Blocks 804-806. However, were another year also expanded, then Blocks 804-806 would be carried out for children of both the 2014 node and the other expanded YEAR node. So, each child condition of the expanded node can be combined via an OR function (Block 804) and the result can be combined with the condition of the selected node via an AND function (Block 806). For instance, if the selected depth is 1 (the YEAR level in the example), then Block 804 combines the children of 2015 (e.g., quarter=Q1 OR Q2 OR Q3). Block 806 then combines these with the condition for the selected node (the 2014 node in the example) (e.g., quarter=Q1 OR Q2 OR Q3 AND year=2014). This opposite axis filter result is highlighted in the below example pseudo code.

For instance, in the example, the server first adds 2014 to the filter, then 2015, and then 2016, each included via an OR function. Once all attributes at this depth have been added, the filter is combined with the other filters via an AND function. When the loop in FIG. 4C performs a second time, for depth 1, or the QUARTER in the WORKED EXAMPLE, the opposite axis filter will combine the quarters using the OR function so that the resulting opposite axis filter for sub query 2 is "AND(YEAR=2014 AND (QUARTER=1 OR QUARTER=2 OR QUARTER=3)."

| SELECT | |
|---|---|
| City | This comes from the item |
| Year | Opposite, depth 0 |
| Sum(Amount) | All amount columns are always included |
| FROM . . . | The tables |
| WHERE | |
| (report filters) | None in this example, but if the user manually placed any filters on the report, they would be included here (e.g. amount >500) |
| AND country='USA' | item filter |
| AND state='CA' | |
| AND ( | These are the filters from the opposite axis at this depth. We want to select all visible years |
| Year = 2014 | |
| OR Year = 2015 | |
| OR Year = 2016 | |
| ) | |

| SELECT | |
|---|---|
| City | This comes from the item |
| Year | Opposite, depth 0 |
| Quarter | Opposite, depth 1 |
| Sum(Amount) | All amount columns are always included |
| FROM . . . | The tables |
| WHERE | |
| (report filters) | None in this example, but if the user manually placed any filters on the report, they would be included here (e.g. amount >500) |
| AND country='USA' | item filter |
| AND state='CA' | |
| AND ( | At this depth, we are interested in visible quarters. Only 2014's quarters are expanded. If 2016 were also expanded, we would include filters for it and its years (Year = 2016 AND (Quarter = 1 OR 2 OR 3)) |
| Year = 2014 | |
| AND ( | |
| Quarter = 1 | |
| OR Quarter = 2 | |
| OR Quarter = 3 | |
| ) | |
| ) | |

Given the opposite axis filters for the sub query at the selected depth (Block 618), three filters of the sub query can be set or created. First, any report filters can be set (no report filters are included in the example). Second, item filters, or filters covering the item being expanded can also be set (these filters can be taken from the sub method of FIG. 4D). In the example, a filter for the parent of the item being expanded, COUNTRY, and a filter for the item being expanded, STATE, are used in the item filter. One can see that results are provided for the child (CITY) of the expanded item, but the filter is based on the item being expanded (STATE) AND the parent thereof (COUNTRY), and is the same filter for both sub queries. The third filter, for the opposite axis, was obtained in the prior step (recall FIG. 4E), and here is added to the report filters and the item filter. All three filters can be combined, for instance, via the AND function. These filters can be used in a WHERE function of each sub query, and therefore in sum can be referred to as a WHERE filter (Block 619). It should be noted that the WHERE filter (Block 619) uses a portion of the item filter even though the blocks 612-616 used to create the item filter are not included within Block 619.

Once the filters have been set, the server determines if a sub query has been created for each depth of the opposite axis down to the maximum depth (Block 622). In the example, this decision 622 looks to see if a sub query has been created for both YEAR and QUARTER. On the first loop of Blocks 610-624, when only a sub query for YEAR has been created, the loop repeats to address the child of YEAR, or QUARTER, and therefor creates "Sub Query 2."

Once the maximum depth has been addressed (e.g., once two sub queries are created in the example), the sub queries can be executed (Block 504) as described relative to FIG. 4B and provide results sets (see example Results set 1 and 2 below):

| Results set 1 | | | |
|---|---|---|---|
| | 2014 | 2015 | 2016 |
| Irvine | 75 | 250 | 300 |
| Tustin | 75 | 250 | 300 |

| Results set 2 | | | |
|---|---|---|---|
| | | 2014 | |
| City | 01 | 02 | 03 |
| Irvine | 25 | 25 | 25 |
| Tustin | 25 | 25 | 25 |

One can see that in both Results set 1 and Results set 2, the results are returned as two separate arrays, each stored in a separate memory block. The column headings are returned in a separate array from values for those columns. The reverse would be true were a column being expanded: row headings and row values would be returned in separate arrays. The returned results sets can then be combined as described relative to FIG. 4F. In short, combining the results sets (Block 506) includes the following three-step loop for each results set (a "selected" results set): (1) adding blank rows and columns to a "combined results set" to be populated by the selected results set (Block 904 and FIG. 4G); (2) add opposite-axis headings to the combined results set (Block 906 and FIG. 4G); and (3) adding data values to the blank rows and columns (Block 908 and FIG. 4H). For each subsequent loop, new rows, columns, and headings can be added to the combined results set as created in a previous loop. This loop (Block 902, 904, 906, 908, and 910) repeats until the results from each sub query have been added to the combined results set (Decision 910). Once all sub queries have been combined into the combined results set, the finished product can be referred to as a "new report." The new report can then be returned to the client and the client can add any necessary new columns or rows and stitch the new report into the existing report (return to Block 404 in FIG. 4A as this constitutes the end of the call EXPAND operation).

Initially, combined results can be set to the result of the first sub query. The results of the first sub query represent the highest level of data in the opposite axis (e.g., YEARS in the example). Subsequent results sets go deeper into the opposite axis (e.g., QUARTER, MONTH, WEEK, etc.).

Figure 4F:
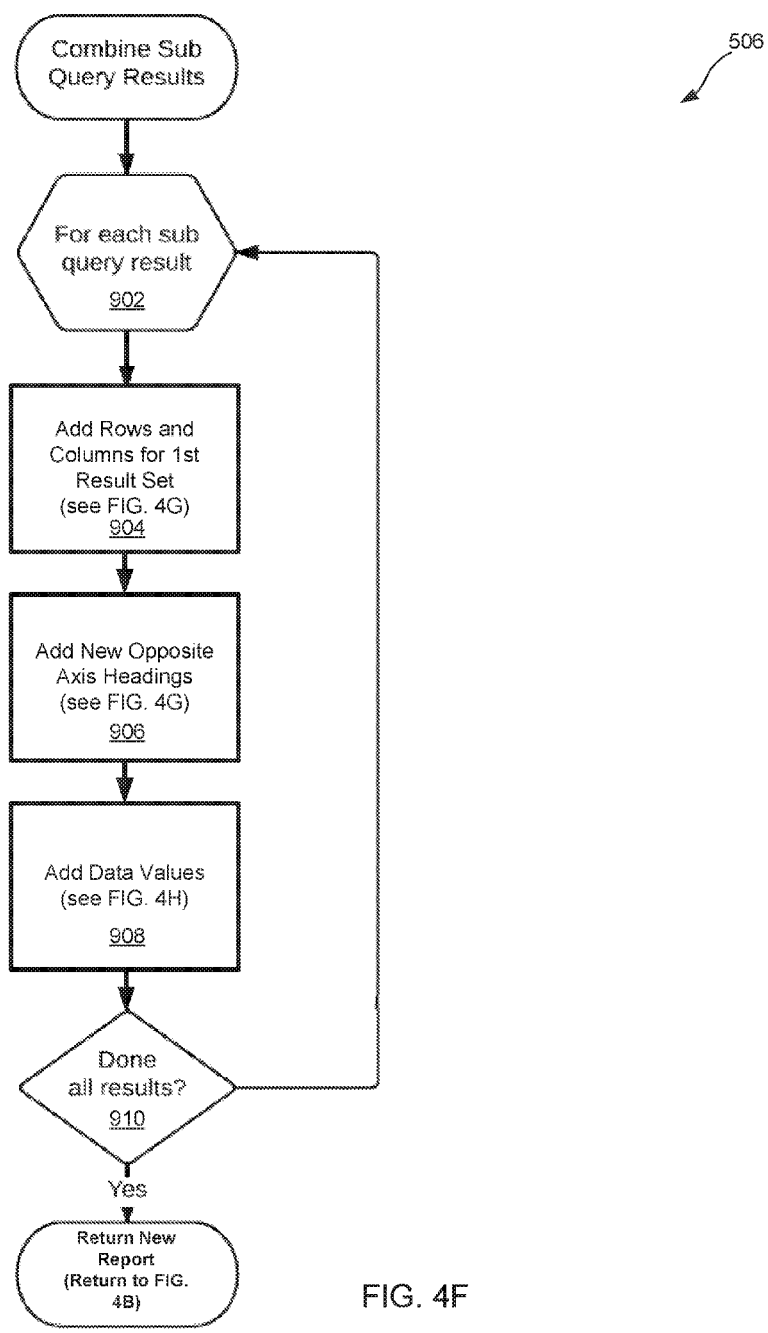
FIG. 4F illustrates an embodiment of a method for combining results sets returned from the sub queries as part of the EXPAND function of FIG. 4A.
Figure 4G:
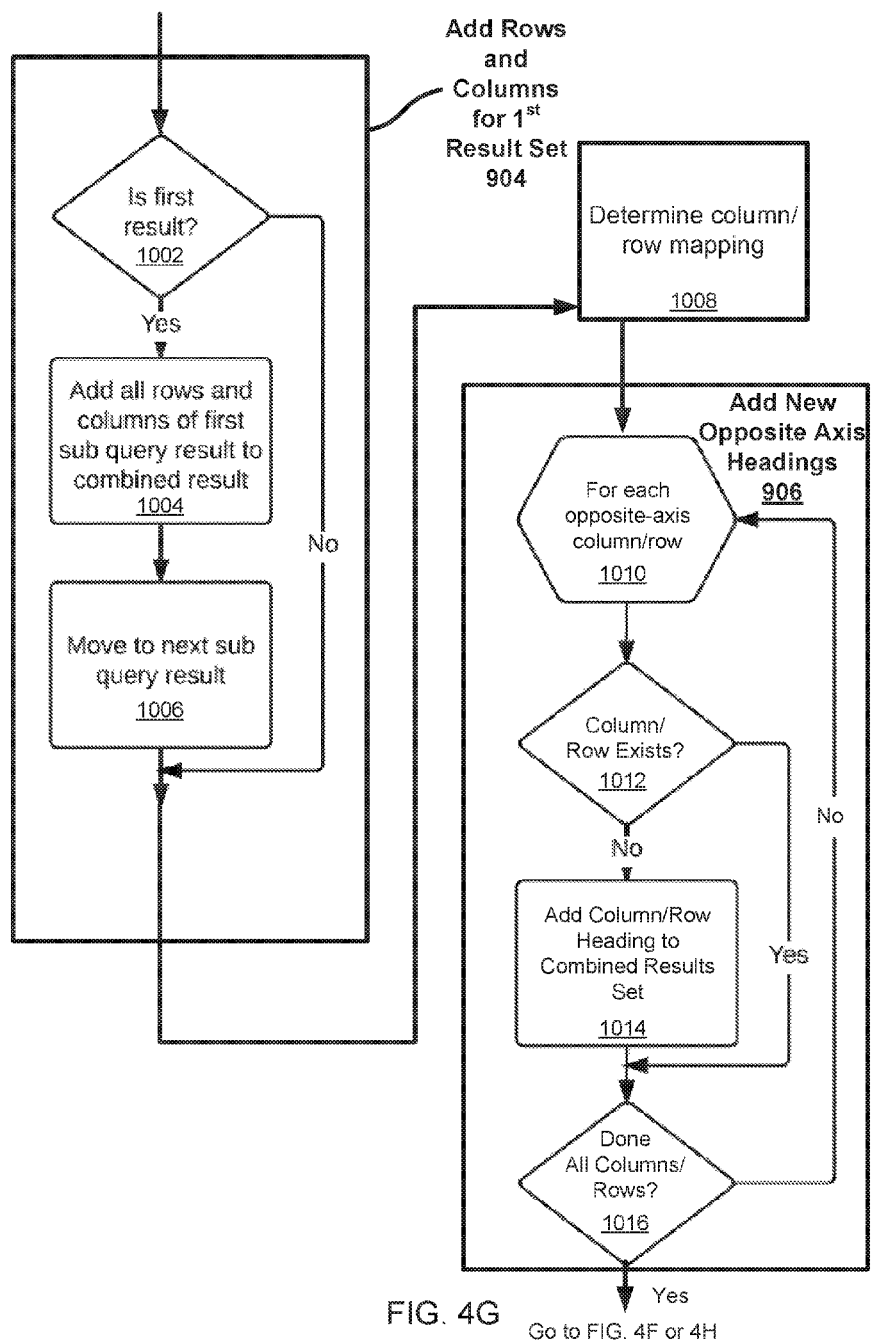
FIG. 4G illustrates an embodiment of a sub method of the process for combining results sets illustrated in FIG. 4F.
Figure 4H:
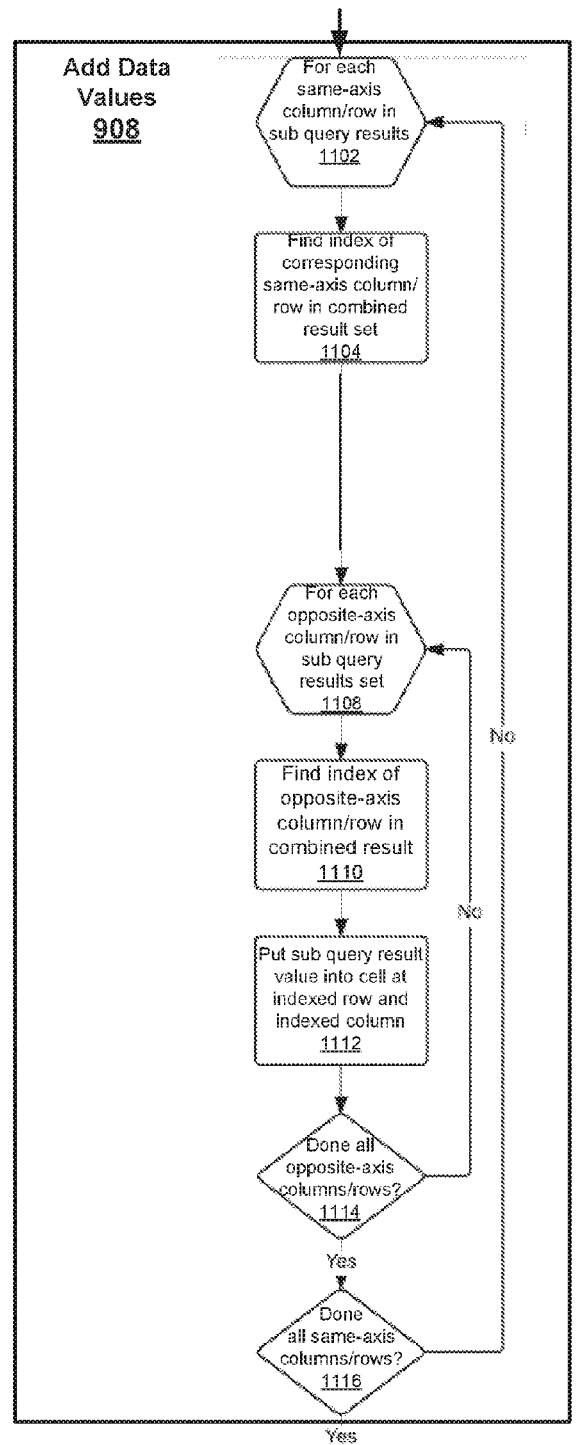
FIG. 4H illustrates an embodiment of a sub method of the process for combining results sets illustrated in FIG. 4F.

FIG. 4G illustrates some details of the first two steps of combining the results of the sub queries (Blocks 904 and 906). One might consider this the first part of formatting the results of the sub queries. If the loop comprising Blocks 904, 906, and 908 is addressing the first results set (Decision 1002) (e.g., Results set 1 in the example), then the server in FIG. 4G adds all rows and columns of the first results set to a combined results set (Block 1004). In other words, the first results set is used as the foundation or basis of the combined results set, and all additional results will be added to this foundation. For instance, in the example, the operation of adding rows and columns for the first results set (Block 1004) would result in two arrays as follows (each stored in a separate block of memory):

|        | 2014 | 2015 | 2016 |
|--------|------|------|------|
| Irvine | 75   | 250  | 300  |
| Tustin | 75   | 250  | 300  |

Once this foundation is established, the server advances from the first results set to a subsequent results set (Block 1006), and as seen in FIG. 4G, the "is first result?" decision (Decision 1002) dictates that the first results set is not addressed in any subsequent loops of Blocks 904, 906, and 908.

For each subsequent results set, the server skips the addition of rows and columns (Block 1004) and starts by determining a column/row mapping (Block 1008). The column/row mapping (Block 1008) helps to move from the mismatched results sets returned from the sub queries (e.g., Results Set 1 and Results Set 2 do not have matching column and row headings) to a final combined results set. For instance, in the example the server can determine that the year 2014 maps to the three quarters Q1, Q2, and Q3. Said another way, the first column of Results Set 1 can map to the first through third columns of Results Set 2 (e.g., 1→[1,2,3], where 1 refers to the first column of data, thus excluding the first column of the results sets, which corresponds to the CITY heading and values). The mapping (Block 1008) can also map rows when a column is the item being expanded.

This mapping can then be used to determine where to add opposite-axis headings for columns/rows that have yet to be added to the combined results set (Block 906) (Block 906 can add column headings where a row is being expanded, and can add row headings where a column is being expanded). In a first loop, there are no new columns, since the combined results set merely includes all columns from the first results set, so Decision 1012 results in "YES", and Block 906 skips the addition of opposite-axis headings to the combined results set (Block 1014). The loop within Block 906 continues until all opposite-axis columns/rows in the selected results set have been addressed (Decision 1016). For the first loop, no headings are added (Block 1014), and once all opposite-axis columns/rows are addressed (Decision 1016), the server moves to add data values to the combined results set (Block 908 and FIG. 4H). In other words, Block 906 does not take action for the first loop, and in some embodiments can be skipped or is non-existent for the first loop.

Block 906 becomes relevant for all subsequent loops (e.g., all results sets other than the first). Similarly, for all result sets other than the first, the addition of rows and columns (Block 904) does not occur, and can be considered optional, skipped, or non-existent for other than the first results set. We now describe in detail the addition of opposite axis headings (Block 906). This sequence of operations loops for each opposite-axis column/row in a selected results set, starting with the first (Block 1010). In the example, Block 1010 would start by selecting the first column in the selected results set (e.g., 2014 for Results Set 1 and Q1 for Results Set 2). The server then determines if the selected opposite-axis column/row exists (Decision 1012). In the example, for Results Set 1, each column already exists, so Decision 1012 will be "YES" for each loop. However, for Results Set 2, no columns exist for the columns in Results Set 2, so each instance of Decision 1012 will result in "NO." Given a column or row that does not exist in the combined results set, the server can then add a heading for the new column or row to the combined results set (Block 1014). In the example, and given Results Set 2, column headings can be added for each loop of Blocks 1010, Decision 1012, Block 1014, and Decision 1016, and the combined results set below shows the addition of these headings. One notices that the values from Results Set 1 are now arranged under the new column headings, which is ultimately inaccurate. However, movement of those values to the right and into the correct columns is addressed separate from this step of adding opposite-axis column/row headings (Block 1014). This continues until column headings have been added for each column/row in the selected results set, where each additional heading moves the existing headings to the right.

|        | 2014 Q1 | 2014 Q2 | 2014 Q3 | 2014 Total | 2015 | 2016 |
|--------|---------|---------|---------|------------|------|------|
| Irvine | 75      | 250     | 300     |            |      |      |
| Tustin | 75      | 250     | 300     |            |      |      |

Also, note that the new headings include values for each level of expansion (e.g., YEAR and QUARTER in the example where the depth of expansion is 1). Also, note that addition of headings may involve addition of a new row to accommodate the new headings (e.g., the row for QUARTER headings in this example). If subsequent results sets were being used, then additional column headings could be added in subsequent loops. Once column headings have been added for each opposite-axis column/row of the current results set (Decision 1016), the server can add data values (Block 908) to the combined results set as detailed in FIG. 4H.

Data value addition (Block 908) can iterate through all columns/rows in the same axis as the item being expanded (Block 1102) (e.g., rows in the example). For each column/row in the same axis as the item being expanded, the server can find an index of the corresponding same-axis columns/rows in the combined results set (Block 1104) (e.g., an index for the row containing IRVINE in the example). Given this same-axis index, the server can iterate through the following for each opposite-axis column/row in the selected sub query results set (Block 1108): (1) find an index of an opposite-axis column/row in the combined results sets (Block 1110) (e.g., an index for each column in the example, such as indexes for Q1, Q2, and Q3 in Results Set 2); and (2) populate a cell corresponding to the row and column index with a value from the corresponding results set (Block 1112). Decision 1114 determines if all opposite-axis columns/rows have been addressed and if so, then the server determines if all same-axis columns/rows have been addressed (Decision 1116). In other words, the decisions 1114 and 1116 ensure that Block 906 iterates through all cells needing to be populated for the selected results set.

The result is that data values from the current results set are added to cells in the combined results set on a cell-by-cell basis starting with an upper leftmost cell and moving across each row, and then restarting with the furthest left cell of the next row. In the example, this means that the values 25, 25, and 25 are added to the Irvine row of the combined results set, such that the first loop of Block 908 results in the following combined results set:

|  | 2014 Q1 | 2014 Q2 | 2014 Q3 | 2014 Total | 2015 | 2016 |
|---|---|---|---|---|---|---|
| Irvine | 25 | 25 | 25 | 75 | 250 | 300 |
| Tustin | 75 | 250 | 300 | | | |

New headings are then added (Block 906) if applicable, and then a subsequent loop of Block 908 is carried out. In the example, the second loop of adding values (Block 906) results in the following combined results set:

|  | 2014 Q1 | 2014 Q2 | 2014 Q3 | 2014 Total | 2015 | 2016 |
|---|---|---|---|---|---|---|
| Irvine | 25 | 25 | 25 | 75 | 250 | 300 |
| Tustin | 25 | 25 | 25 | 75 | 250 | 300 |

One notes that the combined results set can still exists as two separate arrays. Further, once each results set has been addressed, the above arrays can be considered the new report.

The server can then determine what column to insert data into using the mapping (Block 1008) determined in FIG. 4G. Were there more cities expanded in the example, there would be further loops of Block 906, but since only two cities are listed under the state, CA, only two loops of Block 906 are used in the example.

Back in FIG. 4F, once all new rows/columns have been added (Block 904), all new opposite-axis headings have been added (Block 906), and data values have been added to the combined results set (Block 908), the Decision 910 results in "YES" which ends Block 506 and also ends the EXPAND function (Block 404). The server can return the new report to the client, and the client can add any new columns or rows to the existing report (Block 406) and then stitch the new report into the existing report (Block 408) by filling the new columns or rows with the data from the new report. The addition of new rows and columns not only accounts for rows/columns needing to be populated with data values, but also the addition of any opposite-axis columns/rows needed to accommodate new same-axis headings, where a column/row is expended for the first time. For instance, in the example, this is the first time that a STATE is being expanded (e.g., CA), so the client adds a column for the CITIES. Were a column being expanded, then a new row would be added to accommodate the new column headings. If NV was later expanded, a new column would not be added since the CITY column already existed. In the example, this addition of a new column would result in the following:

| Country | State | City | +Q1 | +Q2 | +Q3 | Total 2014 | +2015 | +2016 |
|---|---|---|---|---|---|---|---|---|
| −USA | −CA | | 50 | 50 | 50 | 150 | 500 | 600 |
| | +NV | | 50 | 50 | 50 | 150 | 500 | 600 |
| Total USA | | | 100 | 100 | 100 | 300 | 500 | 600 |

Where the "City" column is new but has yet to be populated with data. One sees that two blank rows have also been added under the row containing CA, to make room for the new report. After stitching in the new report, the existing report would look as follows (where the elements of the new data are underlined):

| Country | State | City | +Q1 | +Q2 | +Q3 | Total 2014 | +2015 | +2016 |
|---|---|---|---|---|---|---|---|---|
| −USA | −CA | | 50 | 50 | 50 | 150 | 500 | 600 |
| | | Irvine | 25 | 25 | 25 | 75 | 250 | 300 |
| | | Tustin | 25 | 25 | 25 | 75 | 250 | 300 |
| | +NV | | 50 | 50 | 50 | 150 | 500 | 600 |
| Total USA | | | 100 | 100 | 100 | 300 | 500 | 600 |

While this example was described in terms of a row expansion following a column expansion, the herein described systems, methods, and apparatus also perform column expansion after a row expansion, and no modification to the underlying code is needed for this ability to be manifested.

This disclosure is not limited to any particular relational database product, but rather, can be used with any relational database system which supports standard SQL.

Figure 5:
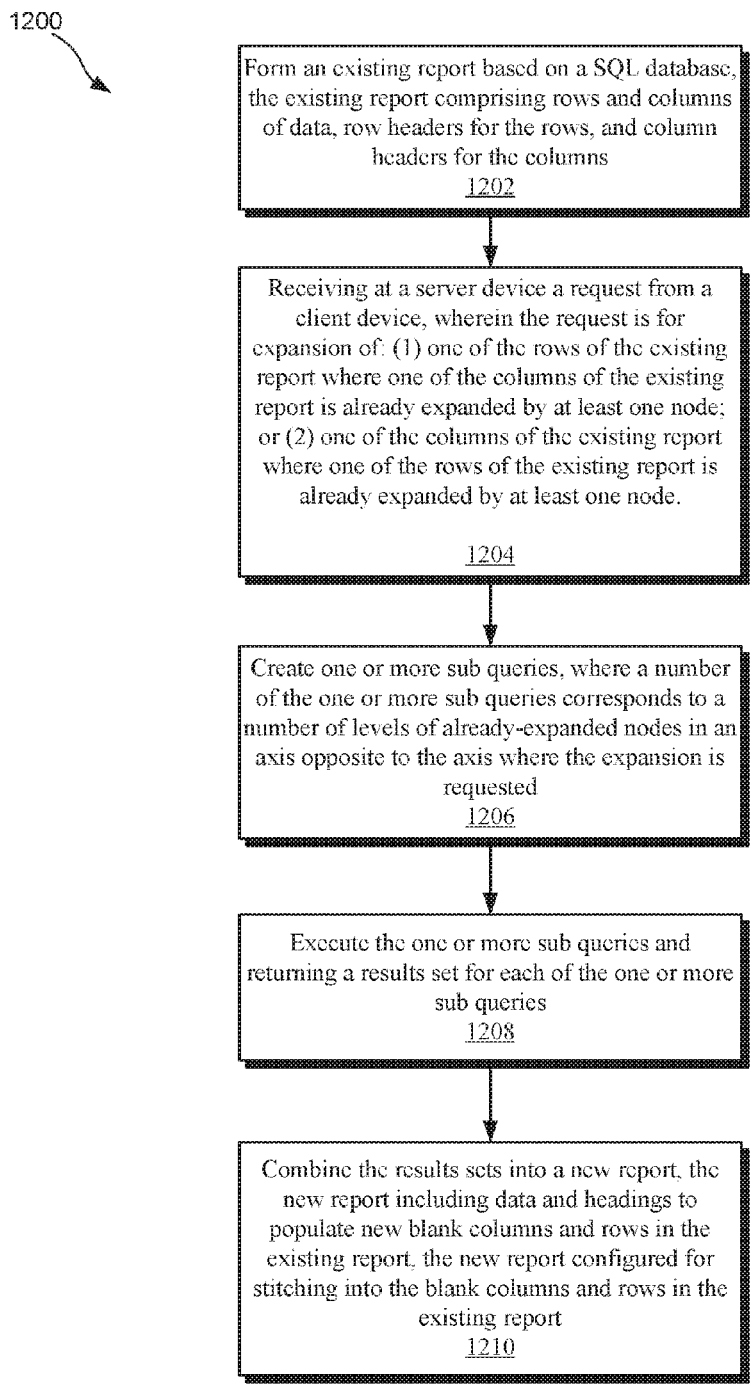
FIG. 5 illustrates a method for multi-axis expansion of a row or column of an existing report, where newly-visible data is sourced from a relational database.

FIG. 5 illustrates a method for multi-axis expansion of a row or column of an existing report, where newly-visible data is sourced from a relational database. The method 1200 begins with the formation of an existing report based on a SQL database (Block 1202) (e.g., a relational database). The existing report can comprise rows and columns of data, row headers for the rows, and column headers for the columns. In an embodiment, a server can create the existing report for display on a client display device. In other embodiments, a combination of the server and client device can form the existing report. The Original Report, or Table 1, is an example of an existing report.

The method 1200 can then receive at a server device a request from the client device, wherein the request is for expansion of rows or columns, where expansion of an opposite-axis row or column has already occurred (Block 1204). In particular, he request is for expansion of: (1) one of the rows of the existing report where one of the columns of the existing report is already expanded by at least one node; or (2) one of the columns of the existing report where one of the rows of the existing report is already expanded by at least one node. In the Original Report, one can see that such a request occurs when either CA or NV is to be expanded, since 2014, an opposing axis node, has already been expanded at the time of the request.

The method 1200 can then create one or more sub queries, where the number of sub queries corresponds to a number of levels of already-expanded nodes in an axis opposite to the axis where the expansion is requested (Block 1206). In the Original Report, one sees that the 2014 node has been expanded. Thus the depth of expansion is 1 (with a base=0), or said another way, there are two levels of expansion. Thus, two sub queries are created whenever expansion of either CA or NV is requested. Block 1206 can be carried out via the server device. In some embodiments, the client can carry out some or all of Block 1206.

The server device can then execute the one or more sub queries and return a results set for each sub query (Block 1208).

The server or client, or a combination of both, can then combine the results sets into a new report, the new report including data and headings to populate new blank columns and rows in the existing report (Block 1210). The new report can further be configured for stitching into the blank columns and rows in the existing report. While the client device can prepare the existing report for stitching (e.g., creating new blank rows and columns), the server may perform the stitching or the client may perform the stitching. In some embodiments, the server can create the new report, stitch the new report into the existing report, and return a stitched report to the client for display on a client display device.

Some prior art attempts to solve the herein-discussed problems have used pre-computed tables or online analytical processing cubes. However, such pre-computed solutions take up massive amounts of storage and are thus neither practical nor desired. In contrast, the herein disclosed solution allows multi-axis expansion without precalculation of the new reports. This greatly improves the speed and memory resources of a computing device using the herein disclosed systems and methods as compared to systems and methods that use pre-calculated solutions.

Figure 6:
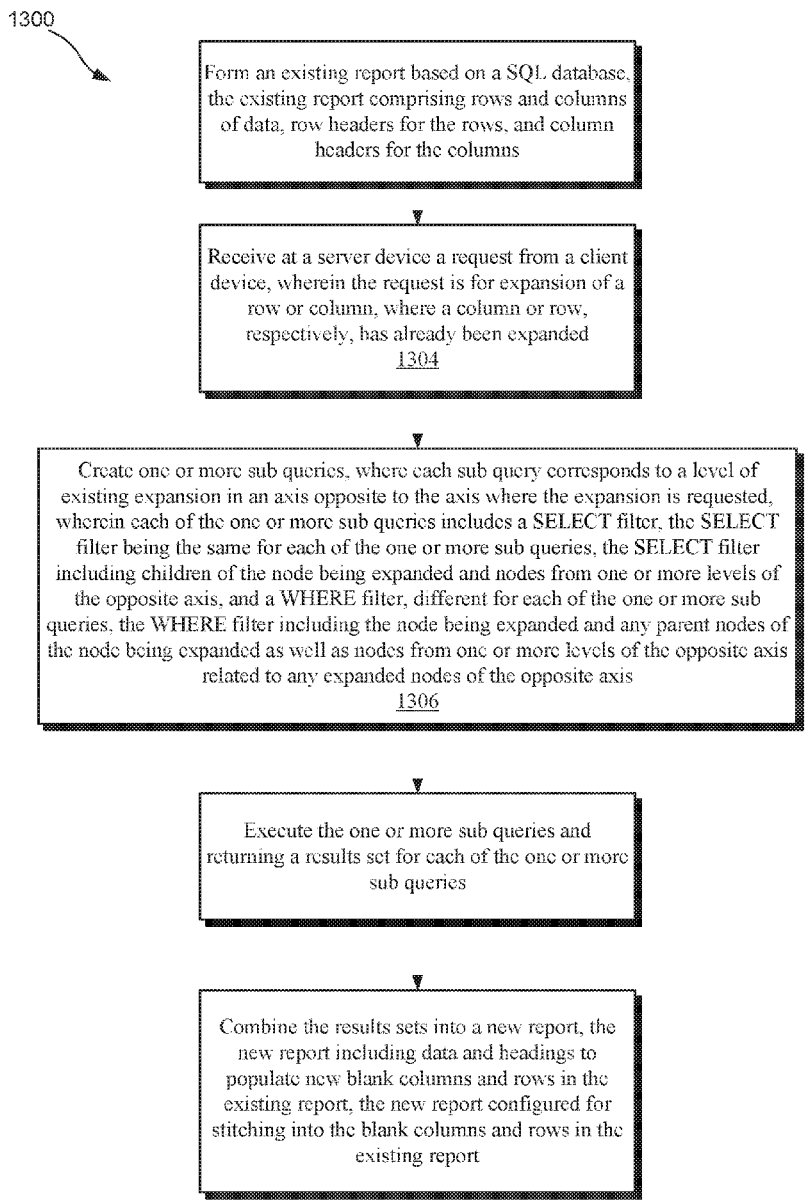
FIG. 6 illustrates another method for multi-axis expansion of a row or column of an existing report, where newly-visible data is sourced from a relational database.

FIG. 6 illustrates another method for multi-axis expansion of a row or column of an existing report, where newly-visible data is sourced from a relational database. The method 1300 is a variation on the method 1200 where operations that differ from the method 1300 are labeled, and those that are the same are neither labeled nor described again. Here, the method 1300 newly includes receiving at a server device a request from a client device, where the request is for expansion of a row or column, where an opposite-axis column or row, respectively, has already been expanded (Block 1304). The method 1300 also newly includes creating one or more sub queries, where each sub query corresponds to a level of existing expansion in an axis opposite to the axis where the expansion is requested, wherein each of the one or more sub queries includes a SELECT filter (Block 1306). The SELECT filter and WHERE filters can be created via corresponding Blocks 613 and 619 in FIG. 4C. In particular, the SELECT filter can include children of the node being expanded and nodes from one or more levels of the opposite axis related to any expanded nodes of the opposite axis. For instance, the SELECT filter in the example would include children of CA, or the CITIES TUSTIN and IRVINE. The SELECT filter in the example would also include the QUARTERS OF 2014 as well as 2014, since these are the opposite-axis nodes related to expanded nodes of the opposite axis. Since neither 2015 nor 2016 are already expanded, these nodes are not added to the SELECT filter. The SELECT filter from the example can also be seen as CITY and YEAR in the pseudo code. The WHERE filter can include the node being expanded (e.g., CA) and any parent nodes of the node being expanded (e.g., USA) as well as nodes from one or more levels of the opposite axis related to any expanded nodes of the opposite axis (e.g., 2014 and QUARTERS within 2014). The SELECT filter is the same for each of the one or more sub queries, whereas the WHERE filter differs from sub query to sub query since it accounts for the different levels of expansion in the opposite axis.

Figure 7:
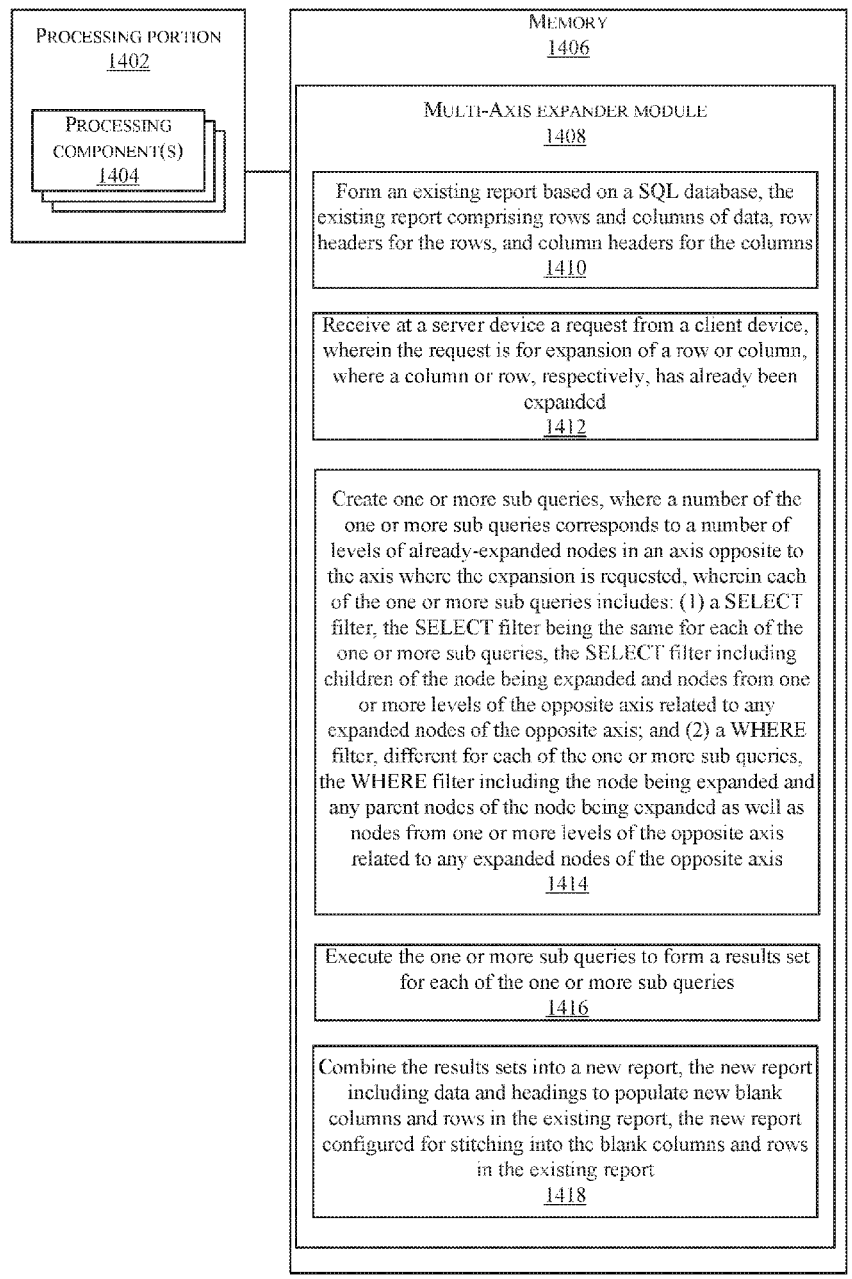
FIG. 7 illustrates one embodiment of a relational database device for performing multi-axis expansion of a row or column of an existing report, where newly-visible data is sourced from a relational database.

FIG. 7 illustrates one embodiment of a relational database device for performing multi-axis expansion of a row or column of an existing report, where newly-visible data is sourced from a relational database. In particular, the relational database does not include pre-computed cells for any new rows or columns that are requested in an expansion request made after an opposite-axis row/column has already been expanded. For instance, online analytical processing cubes have been used to precompute every possible arrangement of data within reports based on an underlying database. However, these cubes take up vastly more storage than the underlying database and are thus impractical. The system of FIG. 7 avoids these storage hurdles by providing real-time expansion of rows and columns, where an opposite axis expansion in a report has already occurred.

The system can include a processing portion 1402 with one or more processing components 1404. A memory 1406 can be coupled to the processing portion 1402 and can include various modules executable on the processing portion to carry out various functions. For instance, a multi-axis expander module 1408 can be stored on the memory 1406, and can be executable on the processing portion 1402 to carry out functions as described throughout this disclosure. For instance, the module 1408 can form an existing report based on a SQL database, the existing report comprising rows and columns of data, row headers for the rows, and column headers for the columns (Block 1410). When executed, the module 1408 can also receive at a server device a request from a client device, wherein the request is for expansion of a row or column, where a column or row, respectively, has already been expanded (Block 1412). Further, the module 1408 can create one or more sub queries, where a number of the one or more sub queries corresponds to a number of levels of already-expanded nodes in an axis opposite to the axis where the expansion is requested, wherein each of the one or more sub queries includes: (1) a SELECT filter, the SELECT filter being the same for each of the one or more sub queries, the SELECT filter including children of the node being expanded and nodes from one or more levels of the opposite axis related to any expanded nodes of the opposite axis; and (2) a WHERE filter, different for each of the one or more sub queries, the WHERE filter including the node being expanded and any parent nodes of the node being expanded as well as nodes from one or more levels of the opposite axis related to any expanded nodes of the opposite axis (Block 1414). The module 1408 can also be executable to execute the one or more sub queries to form a results set for each of the one or more sub queries (Block 1416). Alternatively, the module 1408 can instruct one or more servers to execute the sub queries, where the server can include the processing portion 1402 or can be a separate computing device. Finally, the module 1408 can be executable to combine the results sets into a new report (Block 1418). The new report can include data and headings to populate new columns and rows in the existing report, where the columns and rows can be blank. The new report can be configured for stitching into the blank columns and rows in the existing report.

Figure 8:
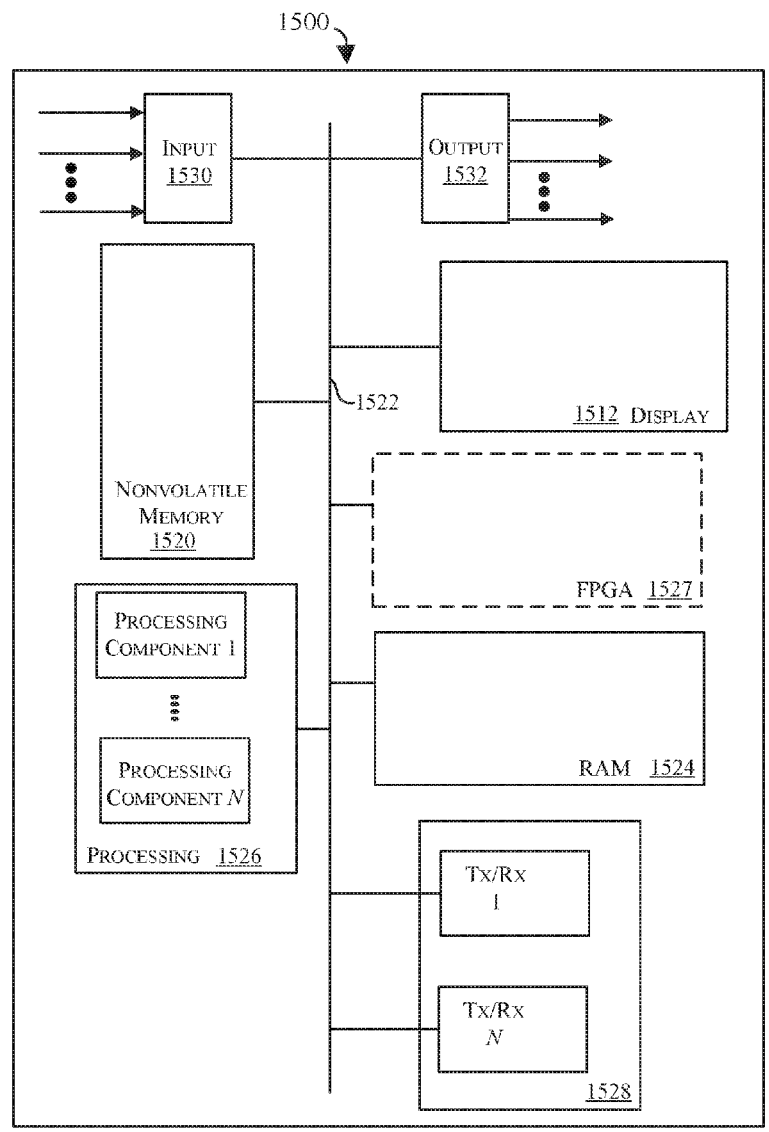
FIG. 8 is a block diagram depicting physical components that may be utilized to realize the processing portion (and an application specific processing device for executing computer readable instructions of the multi-axis expander module generally) according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 8 for example, shown is a block diagram depicting physical components that may be utilized to realize the processing portion 1402 (and an application specific processing device for executing computer readable instructions of the multi-axis expander module 1408 generally) according to an exemplary embodiment. As shown, in this embodiment a display portion 1512 and nonvolatile memory 1520 are coupled to a bus 1522 that is also coupled to random access memory ("RAM") 1524, a processing portion (which includes N processing components) 1526, an optional field programmable gate array (FPGA) 1527, and a transceiver component 1528 that includes N transceivers. Although the components depicted in FIG. 8 represent physical components, FIG. 8 is not intended to be a detailed hardware diagram; thus many of the components depicted in FIG. 8 may be realized by common constructs or distributed among additional physical components. Moreover, it is contemplated that other existing and yet-to-be developed physical components and architectures may be utilized to implement the functional components described with reference to FIG. 8.

This display portion 1512 generally operates to provide a user interface for a user, and in several implementations, the display is realized by a touchscreen display. In general, the nonvolatile memory 1520 is non-transitory memory that functions to store (e.g., persistently store) data and processor-executable code (including executable code that is associated with effectuating the methods described herein). In some embodiments for example, the nonvolatile memory 1520 includes bootloader code, operating system code, file system code, and non-transitory processor-executable code to facilitate the execution of multi-axis expansion as described with reference to method 400 described in FIGS. 4A-H and further herein.

In many implementations, the nonvolatile memory 1520 is realized by flash memory (e.g., NAND or ONENAND memory), but it is contemplated that other memory types may be utilized as well. Although it may be possible to execute the code from the nonvolatile memory 1520, the executable code in the nonvolatile memory is typically loaded into RAM 1524 and executed by one or more of the N processing components in the processing portion 1526.

The N processing components in connection with RAM 1524 generally operate to execute the instructions stored in nonvolatile memory 1520 to enable multi-axis expansion in a report sourced from a relational database. For example, non-transitory, processor-executable code to effectuate the methods described with reference to FIGS. 4A-H may be persistently stored in nonvolatile memory 1520 and executed by the N processing components in connection with RAM 1524. As one of ordinarily skill in the art will appreciate, the processing portion 1526 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1526 may be configured to effectuate one or more aspects of the methodologies described herein (e.g., the method described with reference to FIGS. 4A-H). For example, non-transitory processor-readable instructions may be stored in the nonvolatile memory 1520 or in RAM 1524 and when executed on the processing portion 1526, cause the processing portion 1526 to perform multi-axis expansion of a report based on a relational database. Alternatively, non-transitory FPGA-configuration-instructions may be persistently stored in nonvolatile memory 1520 and accessed by the processing portion 1526 (e.g., during boot up) to configure the hardware-configurable portions of the processing portion 1526 to effectuate the functions of the multi-axis expander module 1408.

The input component 1530 operates to receive signals (e.g., the request for column or row expansion) that start the method 400. The signals received at the input component may include, for example, an Internet packet including a request for expansion of a row or column in an existing report where an opposite-axis row or column is already expanded. The output component generally operates to provide one or more analog or digital signals to effectuate an operational aspect of the multi-axis expander module 1408. For example, the output portion 1532 may provide the new report or stitched report described with reference to Block 408. When the EXPAND function (Block 404) is carried out on a server, the output portion 1532 may provide the new report or stitched report to the client via the HTTP protocol (e.g., via Internet packets).

The depicted transceiver component 1528 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A relational database device for performing multi-axis expansion of a row or column of an existing report, where newly-visible data is sourced from a relational database, the device comprising:
   a processor with one or more processing components therein;
   a memory coupled to the processor;
   a multi-axis expander module stored on the memory and executed by the processor to:
      form an existing report based on a structured query language (SQL) database in response to a first request received from a client computer via a network, the existing report comprising rows and columns of data, row headings for the rows, and column headings for the columns;
      receive at a server computer a second request from the client computer, wherein the second request is for expansion of a row or column, where a column or row, respectively, has already been expanded; and
      create one or more sub queries, where a number of the one or more sub queries corresponds to a number of levels of already-expanded nodes in an axis opposite to an axis where the expansion is requested, wherein the create the one or more sub queries includes measuring a depth of expansion, in the axis opposite, of a tree hierarchy for the existing report, the tree hierarchy stored in memory, wherein each sub query of the one or more sub queries includes:
  a SELECT filter, the SELECT filter being the same for each sub query of the one or more sub queries, the SELECT filter including children of the node being expanded and nodes from one or more levels of the axis opposite related to any expanded nodes of the axis opposite, and
  a WHERE filter, different for each sub query of the one or more sub queries, the WHERE filter including the node being expanded and any parent nodes of the node being expanded as well as nodes from one or more levels of the axis opposite related to any expanded nodes of the axis opposite;
execute the one or more sub queries to form a results set for each sub query of the one or more sub queries;
combine the results sets into a new report, the new report including data and headings to populate new blank columns and rows in the existing report, the new report configured for stitching into the blank columns and rows in the existing report; and
return the new report to the client computer for stitching the new report into the existing report on the client computer to form a final report, or stitching the new report into the existing report on the server computer to form the final report and returning the final report to the client computer.

2. The system of claim 1, wherein values in the row or column being expanded are not pre-computed prior to the expanding.

3. The system of claim 2, wherein online analytical processing cubes are not used.

4. A method of multi-axis expansion of a row or column of an existing report, where newly-visible data is sourced from a relational database, the method comprising:
  forming, by a server computer, an existing report based on a structured query language (SQL) database in response to a first request received from a client computer via a network, the existing report comprising rows and columns of data, row headings for the rows, and column headings for the columns;
  receiving at the server computer a second request from the client computer, wherein the second request is for expansion of a row or column, where an opposite-axis column or row, respectively, has already been expanded; and
  creating at the server computer one or more sub queries, where a number of the one or more sub queries corresponds to a number of levels of already-expanded nodes in an axis opposite to the axis where the expansion is requested, wherein the create the one or more sub queries includes measuring a depth of expansion in the axis opposite of a tree hierarchy for the existing report, the tree hierarchy stored in memory, wherein each sub query of the one or more sub queries includes:
    a SELECT filter, the SELECT filter being the same for each sub query of the one or more sub queries, the SELECT filter including children of the node being expanded and nodes from one or more levels of the axis opposite related to any expanded nodes of the axis opposite, and
    a WHERE filter, different for each sub query of the one or more sub queries, the WHERE filter including the node being expanded and any parent nodes of the node being expanded as well as nodes from one or more levels of the axis opposite related to any expanded nodes of the axis opposite;
  executing, by the server computer, the one or more sub queries and returning a results set for each sub query of the one or more sub queries; and
  combining, by the server computer, the results sets into a new report, the new report including data and headings to populate new blank columns and rows in the existing report, the new report configured for stitching into the blank columns and rows in the existing report; and
  returning the new report to the client computer for stitching the new report into the existing report on the client computer to form a final report, or stitching the new report into the existing report on the server computer to form the final report and returning the final report to the client computer.

5. The method of claim 4, wherein values in the row or column being expanded are not pre-computed prior to the expanding.

6. The method of claim 5, wherein online analytical processing cubes are not used.

7. A computer program product for multi-axis expansion of a row or column of an existing report, where newly-visible data is sourced from a relational database, the computer program product comprising a non-transitory computer readable medium storing a computer readable program, wherein the computer readable program when executed causes the computer to perform steps comprising:
  forming, by a server computer, an existing report based on a structured query language (SQL) database in response to a first request received from a client computer via a network, the existing report comprising rows and columns of data, row headings for the rows, and column headings for the columns;
  receiving at the server computer a second request from the client computer, wherein the second request is for expansion of a row or column, where a column or row, respectively, has already been expanded; and
  creating at the server computer one or more sub queries, where a number of the one or more sub queries corresponds to a number of levels of already-expanded nodes in an axis opposite to the axis where the expansion is requested, wherein the create the one or more sub queries includes measuring a depth of expansion in the axis opposite of a tree hierarchy for the existing report, the tree hierarchy stored in memory, wherein each sub query of the one or more sub queries includes:
    a SELECT filter, the SELECT filter being the same for each sub query of the one or more sub queries, the SELECT filter including children of the node being expanded and nodes from one or more levels of the axis opposite related to any expanded nodes of the axis opposite, and
    a WHERE filter, different for each sub query of the one or more sub queries, the WHERE filter including the node being expanded and any parent nodes of the node being expanded as well as nodes from one or more levels of the axis opposite related to any expanded nodes of the axis opposite;
  executing, by the server computer, the one or more sub queries to form a results set for each sub query of the one or more sub queries;
  combining the results sets into a new report, the new report including data and headings to populate new blank columns and rows in the existing report, the new report configured for stitching into the blank columns and rows in the existing report; and
  returning the new report to the client computer for stitching the new report into the existing report on the client computer to form a final report, or stitching the new report into the existing report on the server computer to form the final report and returning the final report to the client computer.

8. The method of claim 7, wherein values in the row or column being expanded are not pre-computed prior to the expanding.

9. The method of claim 8, wherein online analytical processing cubes are not used.

* * * * *